United States Patent Office 2,931,730
Patented Apr. 5, 1960

2,931,730
PROCESS FOR PREPARING SOLID FAT COMPOSITIONS

Cornelius John Schram, Pavenham, England, assignor to Lever Brothers Company, New York, N.Y., a corporation of Maine No Drawing. Application May 8, 1958
Serial No. 733,818

Claims priority, application Great Britain May 10, 1957

16 Claims. (Cl. 99—118)

This invention relates to oil or fat-containing compositions and, more particularly, to solid free-flowing oil or fat-containing compositions and to processes for their preparation. In the present specification and claims the term "fat" is used in its ordinary meaning to include both solid and liquid oils.

It has previously been proposed to prepare solid compositions containing a high proportion of fat by spray-drying emulsions of fat in skim milk. The solid products so obtained have, however, been unsatisfactory in that the fat was only partially liberated, or liberated slowly and with difficulty, when the composition was mixed with water.

We have found that solid free-flowing fat compositions can be prepared by forming an aqueous emulsion of an edible fat in an aqueous medium at a pH of from about 8 to about 10 in the presence of a milk protein, and drying the emulsion to form a solid.

Compositions according to the invention possess the advantage that they display more ready liberation of oil or fat when mixed with water. In many cases, after mixing with water and centrifuging, the oil or fat will separate as a discrete liquid upper layer.

The present invention provides, therefore, a process for the preparation of a solid oil or fat-containing composition which comprises forming an emulsion of an edible oil or fat in an aqueous medium at a pH of from about 8.0 to about 10.0 in the presence of milk protein, and drying the emulsion to form a solid.

Edible animal, or vegetable oils or fats, such as the mono-, di- or triglycerides, may be used according to the invention. It is preferred that the melting point of the edible fat used should not be greater than about 50° C. Suitable fats include milk fats, such as butterfat, nut oils, such as coconut oil and groundnut oil, lard, oils and fats such as are commonly used in shortenings, for instance hydrogenated vegetable oils, such as hydrogenated soyabean oil and hydrogenated cottonseed oil, and vegetable butters, such as cocoa butter. It is preferred to use sufficient oil or fat that the final product contains at least 50% fat, although solids having a fat content of less than 50%, for instance 25% or less, may be prepared if desired. Most preferably, however, the final product will contain 75% to 85% of fat. It is possible to prepare solids according to the invention having a fat content of 90% or more but the rate of solution of such products may not be entirely satisfactory.

The term "milk protein" is taken to include whey proteins and casein. It is often convenient to use milk both as the aqueous medium and the source of protein; liquid skim milk, reconstituted skim milk and full cream milk can be used. When milk is used as the aqueous medium the amount of protein will usually be determined by the composition of the milk used and sufficient milk protein will be present to constitute at least 3%, by weight, of the final composition. Preferably, sufficient milk protein should be present to constitute 5%, by weight, of the final composition.

The pH at which the emulsion is formed should be at least 8 and the pH of the aqueous medium should be adjusted to a suitable value for instance, by the addition of alkali such as sodium hydroxide, before the emulsion is formed. On the other hand, too high a pH will result in some degradation of the protein, which may cause the final product to be unsatisfactory. A pH of about 10.0 should not be exceeded, and it is preferred not to exceed a pH of about 9.0.

The emulsion can be formed in the presence of an edible oil-soluble, or water soluble emulsifying agent. Oil-soluble emulsifying agents are preferred, particularly monoglyceride esters such as glyceryl monostearate, or a polyglyceryl ester. As an example of a water-soluble emulsifying agent there may be mentioned methyl ethyl cellulose. Generally about 1% of edible emulsifying agent will be sufficient.

Too high a concentration of calcium ions in the aqueous phase should be avoided. The amount of calcium normally found in milk will generally be permissible, as will that of softened water, but hard waters should preferably not be used.

Solid compositions are obtained by drying the emulsion, preferably by spray drying, although slow evaporation of a thin layer of emulsion at a slightly elevated temperature may be carried out. The solid product may be obtained as a powder or granular solid.

The solid compositions obtained have little or no fatty feel or texture and are free-flowing. Such compositions are of value for incorporation in food mixes, such as cake mixes, ice cream mixes or soup mixes or any other compositions where fats or oils are required in concentrated solid form.

All percentages in this specification are percent by weight and are given with reference to the dry weight of the final composition.

The following example illustrates the invention.

*Example 1*

(a) 500 grams of spray dried skim milk powder were dissolved in one litre of substantially calcium free water containing 2 grams of a 33% solution of a commercial preparation of glyceryl monostearate in hydrogenated vegetable oil.

The pH of the concentrated skim milk was then adjusted to 8.0 by the careful addition of 5% sodium hydroxide solution. This solution was allowed to age for one hour and the pH readjusted to 8.0 (if any change had occurred). The solution was then heated to 45° C. and 500 grams of hydrogenated groundnut oil containing 1% glyceryl monostearate was emulsified into it at a temperature of 45° C. The resulting emulsion containing globules of about 5µ in diameter was spray dried to give a granular, free-flowing powder containing 50% of fat which readily reconstitutes to an emulsion when shaken with water.

(b) Example 1(a) was repeated with the exception that 300 grams of spray dried skim milk powder were used and 700 grams of hydrogenated groundnut oil. The fat content of the free-flowing powder obtained was 70% by weight.

(c) Example 1(a) was repeated with the exception that 150 grams of spray dried skim milk powder were used and 1200 mls. of substantially calcium free water. 850 grams of hydrogenated groundnut oil were used in place of the 500 grams in Example 1(a). The fat content of the free-flowing powder obtained was 85% by weight.

What is claimed is:

1. A process for the preparation of a solid edible fat-containing composition, the process comprising forming an emulsion of an edible fat in an aqueous medium at a pH of 8.0 to 10.0 in the presence of at least about 3% milk protein and drying the emulsion while the pH is within that range to form a solid.

2. A process according to claim 1 in which the emulsion is formed at a pH of not greater than 9.0.

3. A process according to claim 1 in which the emulsion is formed in the presence of an oil-soluble edible emulsifying agent.

4. A process according to claim 3 in which the emulsifying agent is glyceryl monostearate.

5. A process according to claim 1 in which the emulsion is formed in the presence of a water-soluble edible emulsifying agent.

6. A process according to claim 1 in which the milk protein is casein.

7. A process according to claim 1 in which the aqueous medium is milk.

8. A process according to claim 1 in which the emulsion is dried by spray-drying.

9. A process according to claim 1 in which the fat content of the final composition is at least 50% by weight.

10. A process according to claim 1 in which the fat content of the final composition is 75%–85% by weight.

11. A process for preparing a solid edible fat-containing composition which readily liberates fat when mixed with water, the process comprising forming an aqueous emulsion of the edible fat in water at a pH of 8 to 10 in the presence of at least about 3% of a milk protein and in the presence of an edible emulsifying agent, and drying the emulsion while the pH is within that range to form a solid.

12. A process as claimed in claim 11 in which the emulsifying agent is present in about 1% by weight of the final composition.

13. A process as claimed in claim 11 in which the emulsifying agent is a monoglyceride fatty acid ester.

14. A process as claimed in claim 11 in which drying is carried out by spray drying.

15. A process as claimed in claim 11 in which substantially calcium free water is used.

16. A process for preparing a solid edible fat-containing composition, the process comprising forming an aqueous emulsion of the edible fat in water at a pH of 8 to 10 in the presence of at least about 3% dried skim milk powder, and about 1% glyceryl monostearate, and drying the emulsion while the pH is within that range to form a solid.

References Cited in the file of this patent

UNITED STATES PATENTS

| | | |
|---|---|---|
| 1,302,486 | Dunham | Apr. 29, 1919 |
| 2,065,675 | Fechner | Dec. 29, 1936 |
| 2,065,676 | Fechner | Dec. 29, 1936 |
| 2,216,485 | Brandt | Oct. 1, 1940 |
| 2,392,833 | Chapin | Jan. 15, 1946 |
| 2,431,497 | North | Nov. 25, 1947 |
| 2,508,393 | Jaeger | May 23, 1950 |
| 2,645,579 | Kemp | July 14, 1953 |